Sept. 27, 1938.  M. T. ZAROTSCHENZEFF  2,131,131
APPARATUS FOR REFRIGERATION
Filed Aug. 3, 1935  2 Sheets-Sheet 1
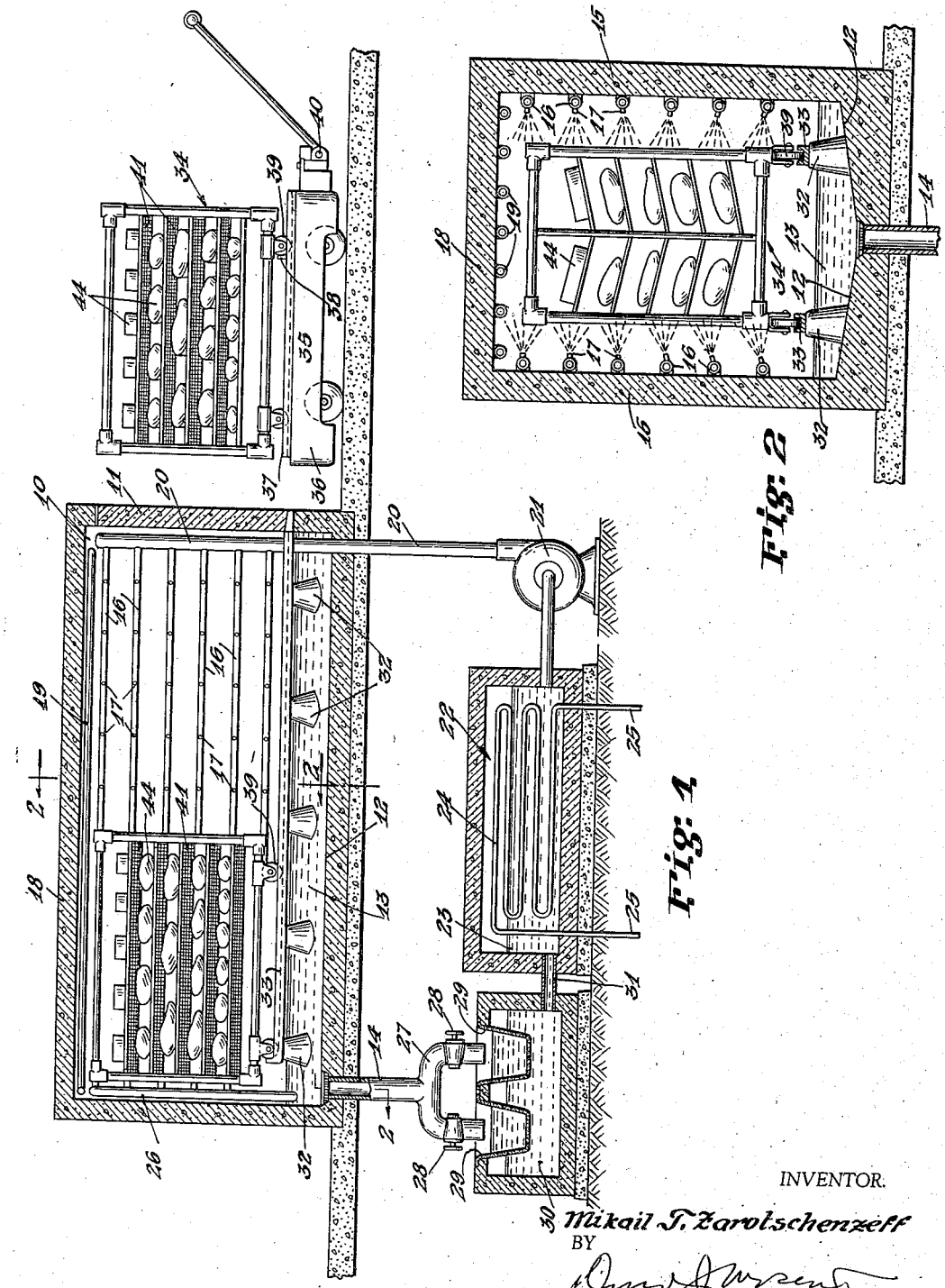
INVENTOR.
Mikail T. Zarotschenzeff
BY
ATTORNEY.

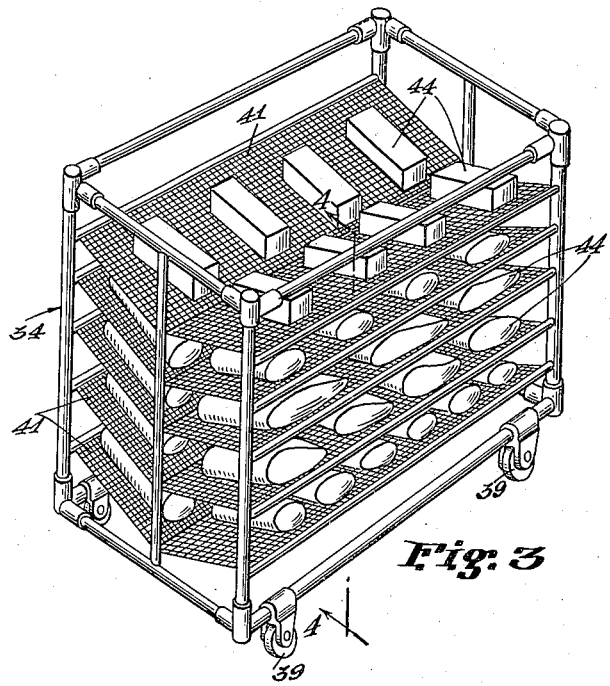
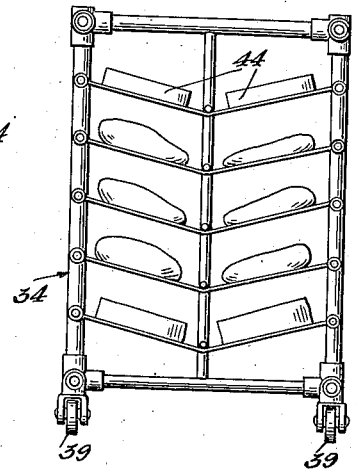
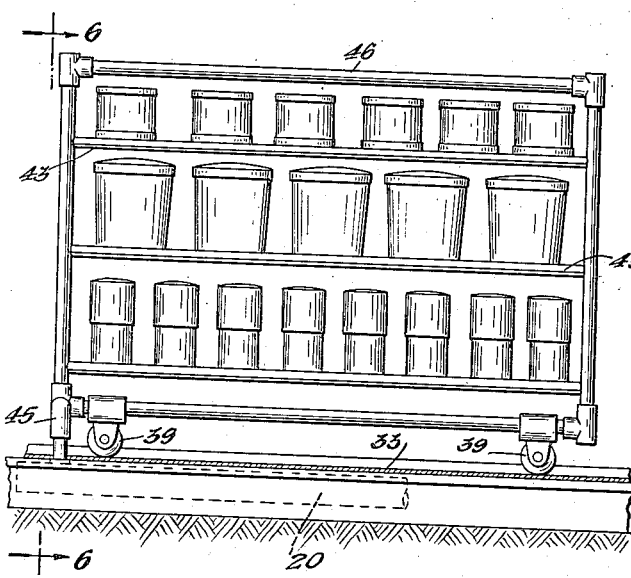
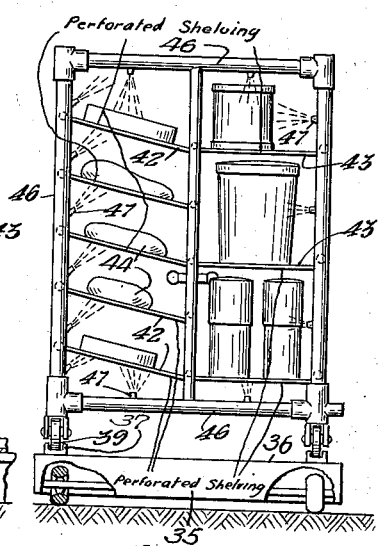

Patented Sept. 27, 1938

2,131,131

UNITED STATES PATENT OFFICE 2,131,131

APPARATUS FOR REFRIGERATION

Mikail T. Zarotschenzeff, Rochester, N. Y., assignor, by mesne assignments, to Z Pack Corporation, Jersey City, N. J., a corporation of Delaware Application August 3, 1935, Serial No. 34,570

7 Claims. (Cl. 62—104)

This invention relates to improvements in apparatus for refrigerating food products, being particularly directed to providing rapid and efficient delivery, freezing and removal of such food products.

In freezing operations, one of the main difficulties lies in the necessity for rapidly and efficiently distributing food products into and out of the freezer chamber, particularly since under present operating conditions the freezing or chilling period is relatively short, while the labor and time required to deliver and remove food products with respect to the freezing chamber is considerably longer, usually several times the freezing period, with the result that a great loss of freezing time and power is entailed.

For example, at the present time, in freezing processes, products have been delivered to the freezer room by trucks, the products removed from the trucks, placed on shelves in the freezer room, and removed from the shelves in the freezer room, placed in trucks and delivered for packing in the cold storage room, which step involves several costly manual operations, plus the additional deficiency in that the freezer room is not used during the "loading" and "unloading" periods.

Broadly, it is an object of this invention to provide a quick freezing system, wherein products to be treated are loaded onto trucks, delivered into the freezing chamber, frozen by sprays and immediately withdrawn from the chamber, with a minimum of loss of time, space and efficiency with respect to the operation of the freezer room.

Specifically, it is an object of this invention to provide for a method of and apparatus for freezing, wherein the products are deposited on trucks, the trucks moved into the freezer room, the freezing operation carried out on the products in the trucks in the freezer room, and thereafter the trucks carrying the frozen product removed from the freezer room into the cold storage room, permitting substantially continuous use of the freezer chamber.

Still further, it is an object of this invention to provide for a novel food carrier of truck construction arranged so as to readily permit and/or provide for spray freezing or chilling in the freezing chamber of all the products carried thereon, the products being so placed and the sprays being so directed as to permit refrigerant contact on all areas of the food products.

Still further, it is an object of this invention to provide a novel system of refrigeration incorporating carriers of food products in quantity, which may be readily directed into and removed from a refrigerating chamber in which the food products are treated, the construction of the carriers being such as to provide a high degree of sanitation and cleanliness within the freezing chamber and on the carrier, this being particularly advantageous in the freezing of unpacked or uncovered food products, such as fish, large meat sections, poultry and the like, the surfaces of which are directly contacted by spray or other refrigerant.

These and other advantages, capabilities, and features of the invention will appear from the subjoined detailed description of one specific embodiment thereof illustrated in the accompanying drawings, in which Figure 1 is a front elevation partly in section, showing freezing room assembly with truck freezers.

Figure 2 is an enlarged end elevation, partly in section, taken along lines 2—2 of Figure 1.

Figure 3 is a perspective view of a truck formation and arrangement.

Figure 4 is an end elevation of the truck freezer, taken along lines 4—4 of Figure 3.

Figure 5 is a front elevation of a modified form of truck with alternate shelf arrangements.

Figure 6 is an end elevation of the modified form of truck having an integral spray assembly supported on an undercarriage which is partly broken away to disclose the wheels.

Referring to the reference characters in the drawings, numeral 10 represents a freezing chamber, shown herein as an insulated cabinet, having an opening at one end, sealed by a door 11, and having a floor 12 sloping towards one end, such floor being further inclined from the side walls of the chamber towards the center, so as to permit drainage of used liquid refrigerant 13 into drain pipe 14 disposed at the lowermost level of the floor.

Within the chamber and along the side walls 15 are disposed series of parallel pipe sections 16, which have nozzles 17 in spaced relationship thereon, the nozzles being formed as to discharge a spray of liquid refrigerant and compressed air of varying degrees of fineness and at such radial direction as to substantially discharge sprays into the chamber reaching all parts thereof (see Figure 2). Within the chamber and supported on roof 18 thereof are spaced refrigerating coils 19 to maintain the chamber at a desired low temperature. The connection from the source of supply of the refrigerating medium for the refrigerating coils is not shown in the drawings, the same being well known in the art. The several pipes 16 are connected to a main header 20 leading to pressure pump 21, which receives liquid refrigerant for discharge into the header and through the nozzles of pipe 16 from the evaporator or cooler 22, which is herein represented in conventional form, the medium for bringing the spray refrigerating liquid 23 therein to the proper temperatures required being the well known type of refrigerating coils 24 connected at free ends 25 to a source of supply not shown. The pipes 16 are sealed at their free ends by closed header 26.

The used liquid refrigerant collected on the sloping floor 12 of the chamber passes down drain pipe 14 into dual outlets 27 controlled by valves 28 so as to permit the used refrigerant to be discharged in one or the other of baskets 29 of the filter 30, whereupon the used refrigerant may be cleaned and passed through conduit 31 into evaporator or cooler 22 for refrigeration and circulation. Although not shown in the drawings, provision may be made for the sterilization of the refrigerant after filtering and before entry into the evaporator or cooler, so as to present in the flow circuit a portion of refreshened or sterilized refrigerant.

Referring in detail to Figures 1 and 2, there are positioned in spaced relationship on the floor a series of pillars 32 which support a pair of grooved or channeled guide rails 33 to permit delivery to and removal from the freezing chamber of trucks carrying the food products to be treated.

The trucks are formed of two sections, a carrier section 34 and an undercarriage 35, the undercarriage comprising a lift platform 36 and spaced grooved rails 37 upon which is disposed a stop 38 for limiting the displacement of the wheels 39 of the carrier 34 when disposed thereon, the lift platform being controllable as to its height by a jack mechanism 40.

Upon the undercarriage there is adapted to be wheeled the carrier 34 comprising, in the illustration herein shown, of a frame formed of pipes for convenience, and supporting a series of spaced shelves 41, shelves preferably being perforated, as shown in Figure 3, and inclined downwardly towards the center from the sides, although, as shown in Figures 5 and 6, the shelving arrangement may be varied to provide some inclined shelf sections 42 and other horizontal sections 43, the inclined shelf sections being adapted primarily to support the food products of irregular shape, while the horizontal shelves are adapted mainly to support food products in containers, such as cans or the like.

As indicated in Figure 1, the carriage 34, the rollers 39 on the base of which rest in the guides 37 of the undercarriage 35, is loaded with food products 44, and the carrier is raised to the proper level so that the same may be wheeled from the undercarriage through door 11 of the freezing chamber and onto guide rails 33 on the chamber for disposition in the freezing chamber, for freezing of the food products.

As shown in Figure 6, a modification is provided wherein instead of having refrigerant conduits and nozzles along the walls of the chamber 10, the atomized spray is delivered from the main header 20 through flexible connections 45 into the hollow tubular frame 46 of the carrier and thence through nozzles 47 formed in spaced relationship along the frame of the carrier, so that the atomized refrigerant may be directed from the carrier frame onto the food products carried on the perforated shelves thereof.

As can be noted from the assembly of the freezing chamber, and the truck construction associated therewith, the chamber and the truck carriers may be readily cleaned by ordinary spray washing so as to provide proper sanitation in the conduct of the refrigerating processes.

In operation, the truck is loaded with food products with the carrier 34 disposed on the undercarriage 35 and directed to the freezing chamber, at which point the wheel lock 38 against the carrier is released and the carrier wheeled along the guide rails 37 of the undercarriage onto guide rails 33 of the freezing chamber, the carrier being directed, as, for example, to the position shown to the left in Figure 1.

The freezing chamber meanwhile has been maintained at necessary low temperatures by the circulation of refrigerating media in conduits 19. When the chamber is loaded with the requisite number of carriers the pressure pump 21 is started and refrigerating liquid passed through header 20 into pipes 16 for discharge through atomizing nozzles 17 on all sides of the product and through the perforated shelves of the carrier. The used refrigerating liquid drops into the base of the chamber, forming a pool 13 along the sloped floor 12; the used liquid passes through drain pipe 14 into filter 30 for purification and thence into evaporator or cooler 22 for rerefrigeration, after which said refrigerating liquid is recirculated through pressure pump 21 through the atomizing nozzles.

After the necessary period of refrigeration, be it quick freezing, or chilling, has been completed, the pressure pump is stopped, and the carriers upon which the food products are disposed withdrawn from the freezing chamber onto undercarriage 35 for subsequent treatment, which may be washing and glazing, and thereafter, if desired, the food products moved into cold storage.

In the modification shown in Figure 6, the operation is substantially the same, as previously described, except that the atomized refrigerating liquid is directed from nozzles carried on the hollow framework of the carriage through a flexible coupling connection of the carrier with the pressure pump or header leading therefrom. In such case it need not be necessary to have spray facilities such as pipes 16 carrying nozzles 17 within the freezing chamber.

Although the refrigerating coils 19 have been shown as disposed only under the ceiling of the freezing chamber, it is within the province of this invention to dispose additional refrigerating coils along the side and end walls of the freezing chamber, the essence of this phase of the construction being that for quick freezing sufficient cooling media be circulated within the freezing chamber to maintain proper temperature so as to provide for the maximum of efficiency of the spray refrigerant discharged onto the food products delivered into the freezing chamber.

It is to be noted, for example, in quick freezing operations, that the freezing chamber may be operated practically continuously, since although the time for quick freezing is from a few minutes to a few hours the time necessary to deliver and remove the trucks carrying food products for treatment is a matter of a few minutes, thus eliminating the necessity for long delays between freezing operations and excessive cost to bring the freezing chamber to proper quick freezing temperatures for successive charges delivered into the freezing chamber.

It is obvious that various changes and modifications may be made to the details of construction without departing from the general spirit of the invention as set forth in the appended claims.

I claim:

1. In a refrigerating apparatus including a chamber, a carrier movable into said chamber and having a series of shelves supporting food products, and means on said carrier for discharging refrigerating media to contact the food products carried thereon substantially on all surfaces thereof.

2. In a refrigerating apparatus including a chamber, a carrier movable into said chamber and having a series of shelves supporting food products, said shelves being of perforate formation, and means including spray heads on said carrier for discharging refrigerating media to contact the food products carried thereon substantially on all surfaces thereof.

3. In a refrigeration system a truck comprising an undercarriage and an open food product carrier, the undercarriage being movable and the carrier being movable with respect to said undercarriage, a series of shelves on said carrier, said shelves being of perforate formation, whereby to permit access on substantially the entire surface area of the food products to refrigerating media.

4. In a refrigeration system a truck comprising an undercarriage and a food product carrier, the undercarriage being movable and the carrier being movable with respect to said undercarriage, a series of shelves on said carrier, said shelves being of perforate formation, whereby to permit access on substantially the entire surface area of the food products to refrigerating media, and nozzles on said carrier through which refrigerant may be discharged in a multi-directional spray upon the exposed surfaces of said food products.

5. In a refrigerating apparatus, a carrier movable into a refrigerating chamber and having a series of shelves for supporting food products, and means on said carrier for discharging refrigerating media to contact the food products carried thereon on a plurality of surfaces thereof.

6. In a refrigerating apparatus, a carrier comprising a frame, a series of shelves on said frame for supporting food products, said frame being formed to provide a conduit for conducting refrigerating media, and means on the carrier communicating with said conduit for discharging refrigerating media to contact the food products carried thereon on a plurality of surfaces thereof.

7. In a refrigerating apparatus, a carrier comprising a frame, a series of shelves on said frame for supporting food products, said frame being formed to provide a conduit for conducting refrigerating media, means on the carrier communicating with said conduit for discharging refrigerating media to contact the food products carried thereon on a plurality of surfaces thereof, and means carried by the frame for connecting said conduit to a source of refrigerant.

MIKAIL T. ZAROTSCHENZEFF.